United States Patent
McMeekin

[15] 3,684,089
[45] Aug. 15, 1972

[54] CONTAINER WALL THICKNESS DETECTION

[72] Inventor: James H. McMeekin, Brockway, Pa.

[73] Assignee: Brockway Glass Company, Inc., Brockway, Pa.

[22] Filed: Sept. 21, 1970

[21] Appl. No.: 73,875

[52] U.S. Cl. .............................. 209/82, 324/61 TK
[51] Int. Cl. .............................................. B07c 1/16
[58] Field of Search ........ 324/71, 61 TK; 209/82, 80, 209/81

[56] References Cited

UNITED STATES PATENTS

| | | | |
|---|---|---|---|
| 2,222,221 | 11/1940 | Burford | 324/61 TK |
| 2,285,152 | 6/1942 | Firestone | 324/61 TK |
| 2,518,045 | 8/1950 | May | 324/61 TK |
| 2,573,824 | 11/1951 | Baker | 324/61 TK |
| 2,616,068 | 10/1952 | McDonald | 209/82 UX |

*Primary Examiner*—Richard A. Schacher
*Attorney*—Christel & Bean

[57] ABSTRACT

A method and apparatus for detecting variations in the thickness of an article, such as a container, of glass or like dielectric material. The container is moved into contact with a sensing means including a plurality of electrodes, each preferably comprising a strip of spring metal. The electrodes each are in rubbing contact with the container outer surface and flexed slightly to conform to a portion of the container wall surface. The electrodes, container wall and surrounding air comprise a capacitance. As the container is rotated about its axis, variations in the container wall thickness are manifested in changes in the capacitance. A circuit connected to the sensing means produces an electrical indication, in response to a change in the capacitance, which capacitance change can be utilized to activate a reject mechanism.

13 Claims, 7 Drawing Figures

INVENTOR
JAMES H. McMEEKIN
BY
Christel & Bean
ATTORNEYS

INVENTOR
JAMES H. McMEEKIN
BY
Christel & Bean
ATTORNEYS

PATENTED AUG 15 1972

INVENTOR
JAMES H. McMEEKIN
BY
Christel & Bean
ATTORNEYS 3,684,089

CONTAINER WALL THICKNESS DETECTION

BACKGROUND OF THE INVENTION

The present invention relates to the detection of variations in the thickness of an article of dielectric material and, more particularly, to the detection of variations in the thickness of a container of glass or like dielectric material.

One area of use of the present invention is the inspection of the wall thickness of glassware formed on automatic forming machines after the glassware has been annealed and cooled, although the principles of the invention can be applied to inspection of other articles of like dielectric material. In the manufacture of glass articles it is necessary to segregate and reject those articles having a wall thickness which deviates, in excess of tolerances, from a predetermined standard. With respect to blown glass containers, it has been found that when a container has a relatively thick sidewall, there will be a correspondingly thin wall portion formed at another part of the container. If the deviation between the thickest and thinnest portion of the container wall exceeds tolerances, the container is not acceptable because it may not withstand pressures of the contents or will not have sufficient strength to withstand handling during the subsequent filling process.

In the past, samples of formed glassware, after annealing and cooling, were mechanically calipered to determine wall thickness, and more recently electrical inspection apparatus has been provided whereby defects can be automatically ascertained and the defective ware rejected without the supervision or attention of any person. A problem arising with such electrical apparatus is the production of false electrical signals from out of roundness or seams present in some glass containers which otherwise have a satisfactory or acceptable wall thickness.

SUMMARY OF THE INVENTION

It would, therefore, be highly desirable to provide a new and improved method and apparatus for automatically detecting variations in the thickness of glass containers or similar articles of like dielectric material and for segregating or rejecting those articles having a wall thickness which deviates from a predetermined standard. It would also be highly desirable to provide such an apparatus which produces an electrical signal in response to such wall thickness deviations but does not produce false signals in response to out of roundness, seams, or similar structural characteristics of glass containers which otherwise have satisfactory and acceptable wall thickness.

The present invention provides apparatus for detecting variations in the thickness of an article formed of a dielectric material, such as a glass container, including a sensing means which when placed in rubbing contact with a surface of the article comprises, along with the article and the surrounding air, a capacitance. The article and sensing means are caused to move relative to each other while in rubbing contact, whereby a variation in the thickness of the article changes the magnitude of the capacitance. An electric circuit connected to the sensing means produces a signal in response to the change in capacitance which signal is utilized, for example, to cause segregation or rejection of an article having a wall thickness which deviates from a predetermined standard.

The present invention will be described with particular reference to the inspection of glass containers for wall thickness, although the principles of the invention can be variously applied to the inspection of similar articles of like dielectric material. While a single specific embodiment of the principles of the present invention is illustrated in the accompanying drawing and described in detail in the following specification, it is to be understood that such embodiment is by way of example only and that various mechanical modifications can be made without departing from the spirit and scope of the invention.

DETAILED DESCRIPTION OF THE ILLUSTRATED EMBODIMENT

Figure 1:
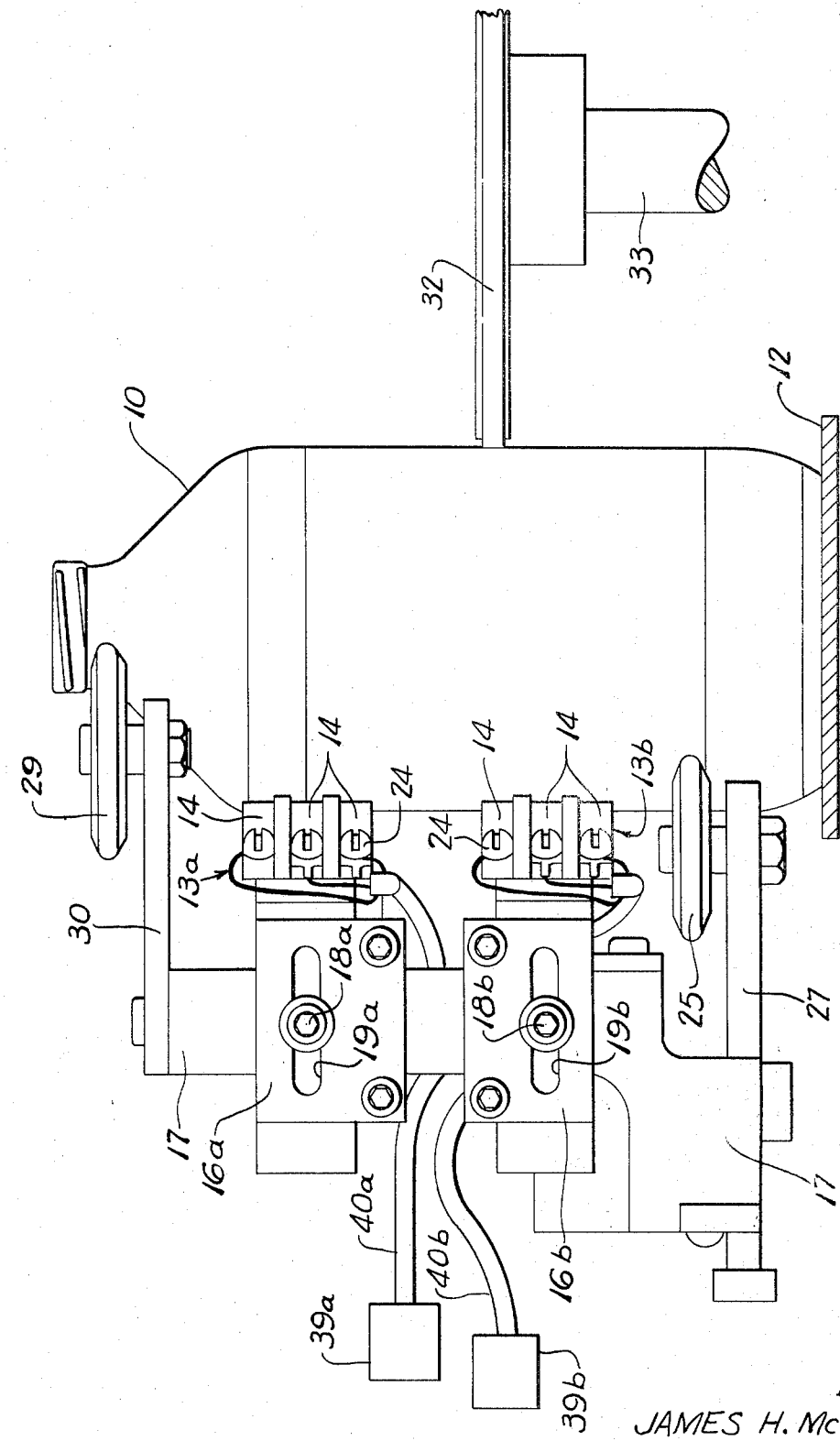
FIG. 1 is a fragmentary elevational view of the apparatus according to the present invention.
Figure 2:
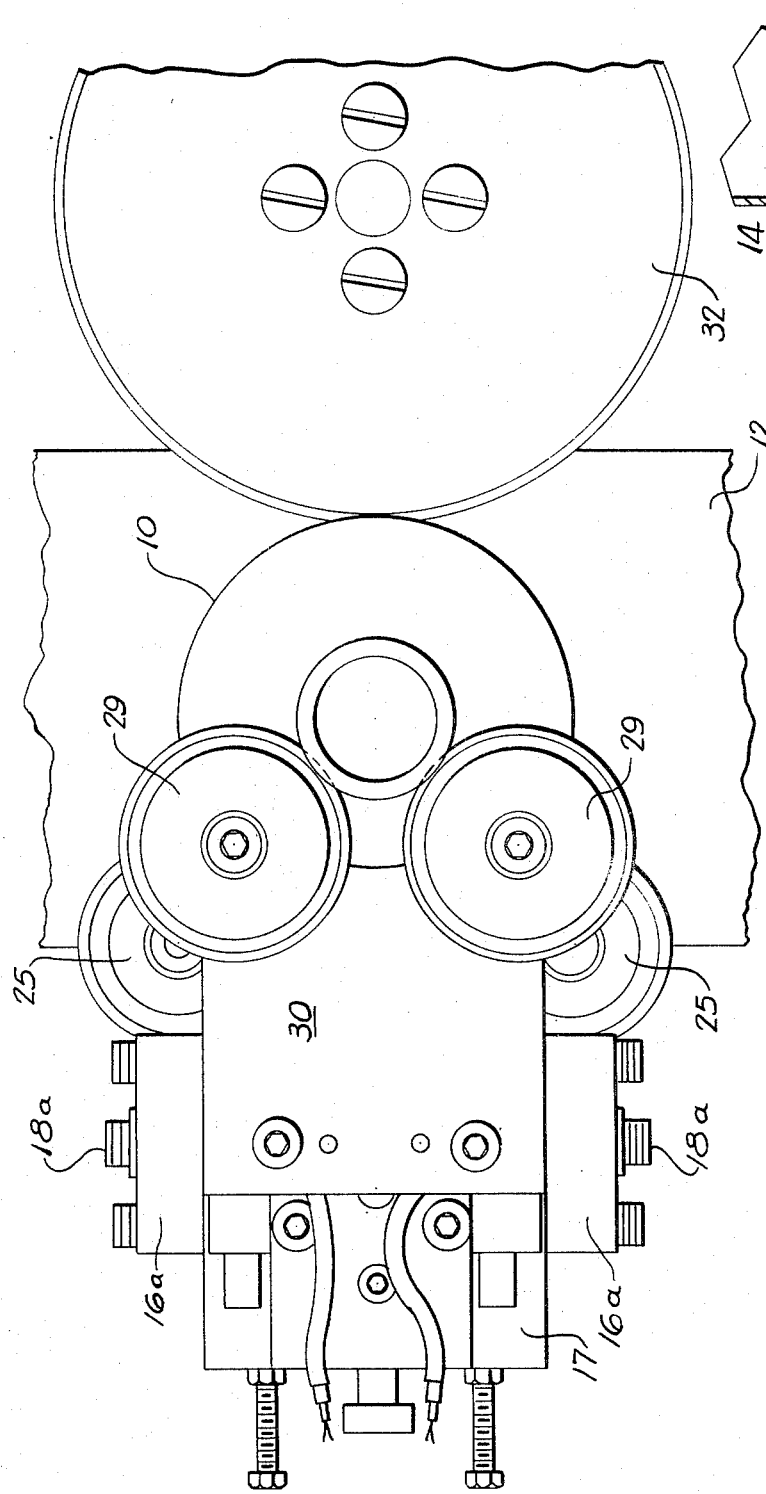
FIG. 2 is a top plan view thereof.

The apparatus of the present invention is particularly intended for detecting variations in the wall thickness of a container, such as that designated 10 in FIGS. 1 and 2, of glass or like dielectric material. A conveyor belt 12 or other suitable means is provided for moving a succession of containers 10 into an inspection station in proximity with the apparatus. Alternatively, the apparatus of course could be moved along a row of stationary containers 10 for successive operation thereon if that would be desirable and practical. The apparatus comprises a sensing means including a plurality of electrodes, each designated 14, of flexible conducting material. In this particular illustration, two sensing means are included, designated 13a and 13b and disposed in vertical spaced relation or, in other words, in axial spaced relation relative to the axis of container 10. Each of the electrodes 14 preferably comprises a strip of resilient or spring metal such as spring steel. In addition, electrodes 14 are mounted at the inspection station by means comprising bracket assemblies 16a and 16b which, in turn, are slidably and adjustably connected in a bracket or post member 17 which is secured or otherwise fixedly mounted at the inspection station. A preferred arrangement for providing this connection includes bolts 18a and 18b extending through corresponding slots 19a and 19b provided in brackets 16a and 16b, respectively, and threadably connected in member 17. Bolts 18a and 18b when tightened so that the heads thereof or washers carried thereby firmly contact brackets 16a and 16b, maintain brackets 16a and 16b in fixed position relative to member 17. Upon loosening of bolts 18a and 18b, this position can be adjusted and the new position maintained by again tightening the bolts as is readily apparent.

Figure 4:
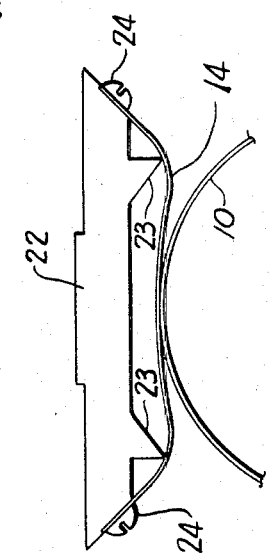
FIG. 4 is a fragmentary elevational view showing a portion of the sensing means of the apparatus of FIGS. 1—3 in operative contact with a container being inspected.

As shown more clearly in FIG. 4, each electrode 14 is mounted in a manner permitting it to flex and conform to the shape of the surface of container 10 when the container is placed in rubbing contact with electrodes 14. In preferred form, each bracket 16 includes a member 22 having spaced apart pointed projections 23, the tips or outer points of which contact strip 14 thereby defining a space between strip 14 and the main body of bracket 16. Strips 14 are secured at opposite ends thereof by suitable fastening means such as screws 24 which also permit electrical connection of leads to electrodes 14 as will be described in detail presently.

The apparatus of the present invention further comprises means at the inspection station for placing container 10 in rubbing contact with electrode 14 and for rotating container 10 about its vertical axis. In preferred form there is provided a yoke type arrangement including a pair of wheels 25 rotatably mounted on a plate 27 or arm which, in turn, is secured to main bracket 17 in relatively close proximity to the surface of conveyor belt 12. Wheels 25 are positioned in spaced relation so as to contact container 10 near the bottom thereof. Thy yoke arrangement further comprises a pair of wheels 29 rotatably mounted on an arm or plate 30 which also is secured to bracket or post 17 and in vertical spaced relation to arm 27. Wheels 29 are spaced apart a shorter distance than wheels 25, whereby they contact container 10 near the relatively narrow neck portion thereof. A spinner wheel or disk 32 is positioned so as to contact container 10 when the container is positioned in the yoke arrangement of wheels 25 and 29. Wheel 32 is connected by a shaft 33 to a suitable drive means (not shown) for rotating the same. Upon rotation of wheel 32 it is apparent that container 10 likewise will be rotated about its vertical axis. The circumferential edge of wheel 32 can be of a material which enhances the frictional engagement between wheel 32 and container 10 but which does not scratch or damage the container surface. The apparatus also would be provided with suitable means for moving the yoke arrangement of wheels 25, 29 away from container 10 together with the sensing means 13 so that the container can leave the inspection apparatus and the next successive container be placed therein. For example, bracket member 17 can be attached to the rod of an hydraulic cylinder. Such mechanical arrangements, however, are deemed to be readily apparent to those skilled in the art so a detailed description thereof is believed to be unnecessary.

Sensing means 13a is connected to an indicating means 39a by means comprising a coaxial cable 40a. Indicating means 39a comprises an electrical circuit for producing a signal in response to variations of the wall thickness of container 10 which exceed a predetermined amount. In a similar manner, sensing means 13b is connected through a coaxial cable 40b to a corresponding indicating means 39b comprising a circuit for producing similar signals. The outer conductor of each coaxial cable, for example cable 4a, is connected to each of the outer bands or electrodes 14, connection being provided by the corresponding screws 24. The inner conductor of cable 40a is connected to the middle or center band or electrode 14 of sensing means 13a. An identical connection is provided between cable 40b and the corresponding electrodes 14 of sensing means 13b.

Figure 5:
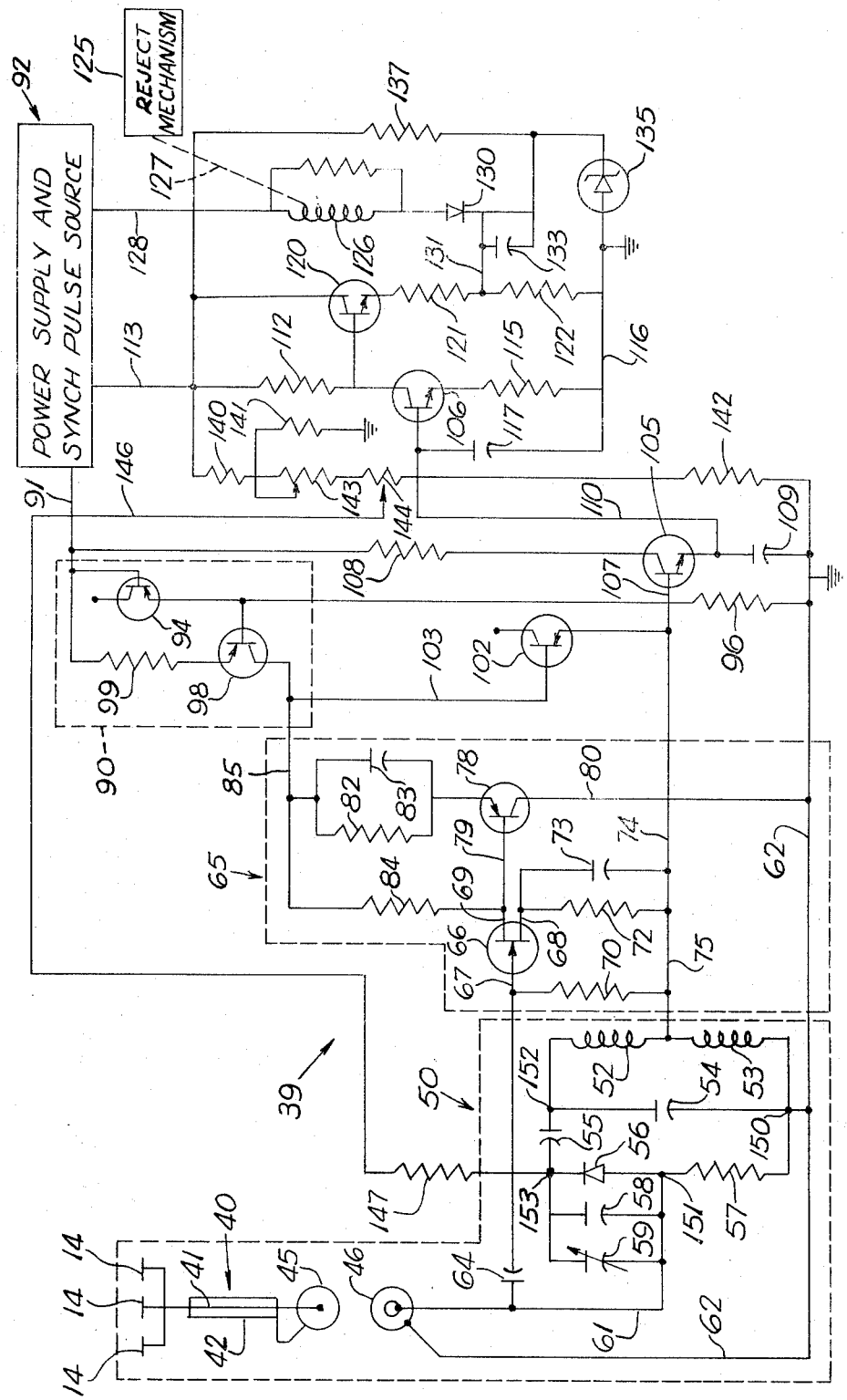
FIG. 5 is a schematic diagram of an electric circuit included in the apparatus of the present invention.

FIG. 5 shows in detail a preferred form of an electrical circuit included in the apparatus of the present invention for producing a signal when the wall thickness of container 10 varies in excess of tolerances from a predetermined standard. The coaxial cable shown in FIGS. 1 and 2 is indicated at 40, it being understood that a circuit similar to that of FIG. 5 is included for each sensing means as will be described in more detail further on in the specification. Cable 40 has an inner conductor 41 which, as previously described, is connected to the center electrode or band 14 and an outer conductor 42 which is connected to each of the outer electrodes or bands 14. In preferred form cable 40 is of the Belden 8254 type having a length of about 18 inches. Cable 40 terminates in a standard connector member 45 which fits into or mates with a corresponding connector member 46. When connection is made, the bands or strips together with cable 40 are included in a feedback bridge portion 50 of the circuit of FIG. 5.

Bridge 50 further comprises a feedback transformer including a pair of series connected windings 52 and 53. A capacitor 54 is connected in parallel with the series combination of windings 52 and 53. One terminal of capacitor 54 is connected through another capacitor 55 to the cathode of a diode 56, and the anode of diode 56 is connected through a resistor 57 to the other terminal of capacitor 54. A fixed capacitor 58 is connected in parallel with diode 56, and a variable capacitor 59 is connected in parallel with capacitor 58. The center terminal of connector member 46, which when mated with connector 45 is connected to inner conductor 41 of cable 40, is connected through a line 61 to capacitors 58 and 59 at the junction thereof which is connected to the anode of diode 56. The outer terminal of connector 46 which when mated with connector 45 is electrically connected to the outer conductor of cable 40 is connected to a line 62 which is at a reference or ground potential for the circuit.

The signal developed by feedback bridge 50 is coupled through a capacitor 64, one terminal of which is connected to line 61, to the input of a two stage L-C oscillator designated generally at 65 in FIG. 5. Oscillator 65 includes a field effect transistor 66 having a gate terminal 67 and source and drain terminals 68 and 69, respectively. Gate terminal 67 is connected to capacitor 64 of feedback bridge 50 and through a resistor 70 to the junction of transformer windings 52 and 53. Source terminal 68 is connected through the parallel combination of a source resistor 72 and a capacitor 73 to a line 74 for connection to another circuit stage, and through a lead 75 to a point common to resistor 70 and the junction of transformer windings 52, 53.

Oscillator 65 further comprises a transistor 78, the base terminal of which is connected through a lead 79 to drain terminal 69 of transistor 66. The collector terminal of transistor 78 is connected through a lead 80 to ground or reference potential line 62. The emitter terminal of transistor 78 is connected through the parallel combination of a resistor 82 and capacitor 83 to one terminal of a resistor 84 and to a line 85 for connection to another circuit stage. The other terminal of resistor 84 is connected to drain terminal 69 of transistor 66.

Oscillator 65 is connected through line 85 to a circuit portion 90 which, in turn, is connected through a line 91 to a power supply designated generally at 92 in FIG. 5. Power supply 92 also is indicated as providing a source of synchronizing pulses for synchronizing the operation of various portions of the circuit of FIG. 5 as will be readily understood by those familiar with this art. Circuit 90 function as a decoupled current source and includes a first transistor 94, the base terminal of which is connected to line 91 and the emitter terminal of which is connected through a resistor 96 to ground potential line 62. The collector terminal of transistor 94 is disconnected. Circuit 90 further includes a second transistor 98, the base terminal of which is connected to the emitter terminal of transistor 94. The collector terminal of transistor 98 is connected to line 85, and the emitter terminal thereof is connected through a resistor 99 to line 91.

The circuit of FIG. 5 further includes a transistor 102, the base terminal of which is connected through a line 103 to line 85 from oscillator 65. The collector terminal of transistor 102 is disconnected, and the emitter terminal is connected to line 74. Transistor 102 thus functions in a manner similar to a zener diode to provide d.c. coupling.

The circuit of FIG. 5 further includes a Darlington circuit comprising a first transistor 105 which provides the output transistor stage and a second transistor 106 which comprises the amplifier stage. The base terminal of transistor 105 is connected through a lead 107 to line 74 and to the emitter of transistor 102. The collector terminal of transistor 105 is connected through a resistor 108 to line 91 from power supply 92. The emitter terminal of transistor 105 is connected through a capacitor 109 to ground potential line 62, and through a line 110 to the base terminal of transistor 106. The collector terminal of transistor 106 is connected through a resistor 112 and a line 113 to power supply and synch. pulse source 92, and the emitter terminal of transistor 106 is connected through a resistor 115 to a line 116 which is at a reference or ground potential. A capacitor 117 is connected between the base terminal of transistor 106 and ground potential line 116.

The output of amplifier transistor 106 is connected to a buffer stage comprising a transistor 120 and the series combination of resistors 121 and 122. The base terminal of transistor 120 is connected to the collector terminal of transistor 106, and the collector terminal of transistor 120 is connected to line 113. The emitter terminal of transistor 120 is connected through resistors 121 and 122 to line 116.

The circuit of FIG. 5 finally includes a control portion for operating a reject mechanism, indicated generally at 125, in a controlled manner. A solenoid 126 is operatively connected to mechanism 125 as indicated by the dashed line 127. Solenoid 126 is connected at one terminal thereof through a line 128 to a power supply and synch. pulse source 92, and at the other terminal thereof to the anode of a controlled rectifier 130. The control or gate terminal of controlled rectifier 130 is connected to the junction of resistors 121 and 122 by a line 131. A capacitor 133 is connected between the gate terminal and cathode of controlled rectifier 130, and the cathode of rectifier 130 is connected through a zener diode 135 to ground potential line 116 and also through a resistor 137 to line 113. A resistor 139 is connected in parallel with solenoid 126.

A network comprising fixed resistors 140, 141 and 142 and variable resistors 143, 144 is connected between line 113 from power supply 92 and ground or reference potential line 62. The wiper arm of variable resistor 144 is connected through a line 146 and a resistor 147 to the cathode of diode 56 in feedback bridge 50 whereby remote voltage tuning of bridge 50 can be accomplished as will be described in detail presently.

The method of the present invention is performed by operating the apparatus thereof in the following manner. A container 10 is moved by conveyor belt 12 to a position for inspection whereby wheels 25 contact the outer surface of container 10 near the base or bottom thereof and wheels 29 contact the neck of container 10. Wheel 32 is moved into contact with container 10, preferably at a point about midway between the top and bottom thereof. Wheels 25, 29 and 32 are positioned so that the outer surface of container 10 is in rubbing contact with the bands or strips 14 comprising the electrodes of sensing means 13. As shown more clearly in FIG. 4, the bands 14 while normally straight are depressed approximately one-eighth of an inch during testing. This flexing of electrodes 14 whereby they wrap around a portion of the container surface insures against false readings resulting from out of roundness or seams on the surface of container 10 as will be explained in further detail presently.

Figure 6:
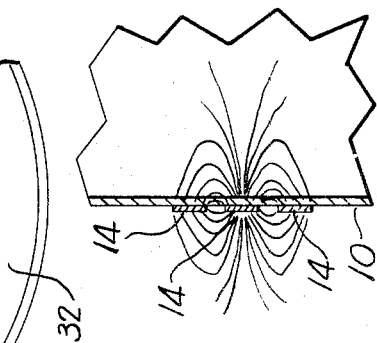
FIG. 6 is a diagrammatic view illustrating a portion of the operation of the apparatus of the present invention.

Sensing means 13 comprising electrodes 14 placed in rubbing contact with the surface of container 10 comprises, jointly with the wall of container 10 and the surrounding air, a capacitance. When the circuit of FIG. 5 is placed in operation and connection is made between the connectors 45 and 46, a fringing electric field enters the side wall of container 10. Referring to FIG. 6, a section of the wall of container 10 is shown against bands 14, the outer band being at one potential and the inner band at another. The field lines shown roughly indicate the flux emanating from the plates. The strongest field is indicated of course by the shortest flux lines, which are those in the air gap between the edges of the bands 14. The fringing electric field passes through the wall of container 10 along the entire circumference thereof as the container is rotated about its axis. Because some of the field passes through air at all times, any changes in the electrical current through the capacitor results only from a change in the thickness of the glass. This can be stated mathematically according to the following equation:

$$I_c = (Vc)(2pi)fe\, A/D$$

where $I_c$ is the current through the capacitor, $Vc$ the voltage across the capacitor, $2pi$ a constant, $f$ the frequency of that voltage, $e$ the permittivity of the dielectric, i.e., of the glass, $A$ the area of the plates of the capacitor, and $D$ the distance between the plates. In the apparatus of the present invention the only variables in this equation are the permittivity and the current. The permittivity of glass is, of course, approximately seven times as great as the permittivity of air. According to the method of the present invention only a portion of the air is substituted by the glass, although this portion will vary as the wall thickness of container 10 varies.

Changes in the wall thickness of container 10 produce a change in capacitance, as container 10 is rotated about its axis, which is detected by the circuit of FIG. 5 to provide an electrical indication or signal when the changes exceed predetermined tolerances. The capacitance provided by bands 14 in rubbing contact with the wall of container 10 and the surrounding air constitutes one leg of the feedback bridge circuit indicated at 50 in FIG. 5. The other legs of the bridge are provided by the feedback transformer including windings 52 and 53 together with the other capacitors in circuit portion 50. Bridge circuit 50 operates in a manner such that whenever the capacitance provided by bands 14, the wall of container 10, and the surrounding air changes, i.e., when the container wall thickness changes, the voltage fed back to field effect transistor 66 in oscillator 65 is changed from positive feedback to negative feedback. Whenever this feedback voltage is changed from negative to positive feedback, an oscillating signal is provided by oscillator portion 65. The oscillating voltage appearing on line 74 is demodulated by the operation of transistor 102 and then amplified and inverted by the Darlington circuit comprising transistors 105 and 106. This signal, in turn, inhibits or disables controlled rectifier 130 thereby maintaining solenoid 126 deenergized and rendering reject mechanism 125 inactive. Accordingly, as long as the wall thickness of container 10 does not vary more than a predetermined standard, as determined by the tuned condition of bridge 50, the circuit of FIG. 5 produces an oscillating voltage from portion 65 so that the particular container 10 being inspected is not rejected.

Feedback bridge portion 50 is tuned or adjusted so that a change in capacitance resulting from a variation in wall thickness of container 10 will stop the oscillating signal normally produced by oscillator portion 65 thereby resulting in operation of reject mechanism 125. The capacitance provided by bands 14 in rubbing contact with the wall of container 10 together with the surrounding air appears in feedback bridge portion 50 between the terminal or point designated 150 and the point or terminal designated 151 in FIG. 5. In other words, this capacitance is connected across resistor 57. A relatively thicker wall portion of glass container 10 increases the capacitance across terminals 150, 151 and a relatively thinner wall portion of glass container 10 decreases the capacitance across terminals 150, 151. Feedback bridge 50 is tuned or adjusted so that when the capacitance across terminals 150, 151 reaches either a maximum or a minimum value, the oscillator 65 is caused to no longer produce an oscillating output signal. If the capacitance across the points indicated at 151 and 152 in FIG. 5 is increased, either by adjusting the magnitude of capacitor 59 or by varying the voltage applied to point 153 as by adjusting potentiometer 144, oscillator portion 64 will stop oscillating at a high capacitance appearing across terminals 150, 151. If, on the other hand, the capacitance between points 151 and 152 is decrease by either adjusting capacitor 59 or varying the voltage applied to point 153, oscillator portion 65 will stop oscillating at a relatively low capacitance appearing across terminals 150, 151. When oscillator portion 65 stops, in response to a variation in the container wall thickness, a voltage is applied to the control or gate terminal of controlled rectifier 130 of a magnitude and polarity to render rectifier 130 conducting. Current flows through solenoid 126 thereby actuating a conventional reject mechanism 125. The particular container 10 being tested, therefore, is rejected.

According to a preferred mode of the present invention, capacitor 59 has a range in magnitude from one to 120 picofarads. Capacitor 54 has a magnitude of 620 pf., capacitor 55 a magnitude of 0.01 $\mu\mu f.$, capacitor 58 a magnitude of 270 pf., and capacitor 64 a magnitude of 56 pf. Resistor 57 has a magnitude of 1 megohm. Transistor 66 is of the 2N4302 type, resistor 84 has a magnitude of about 12 K and the magnitude of resistor 72 is selected to give a bias current of 125 microamperes through resistor 84.

An advantage of the apparatus of the present invention is that a container 10 is rejected only because of wall thickness variation beyond tolerances and not merely because of the presence of seams or out of roundness in the container outer surface. This is because the bands or electrodes 14 are in rubbing contact with the outer surface of container 10 thereby preventing the occurrence of any spurious signals from the seams or out of roundness conditions. In addition, the greater the degree of flexure of electrodes 14 and the more wrap around on the surface of container 10 which results, the more effective is the apparatus in preventing spurious signals.

Figure 3:
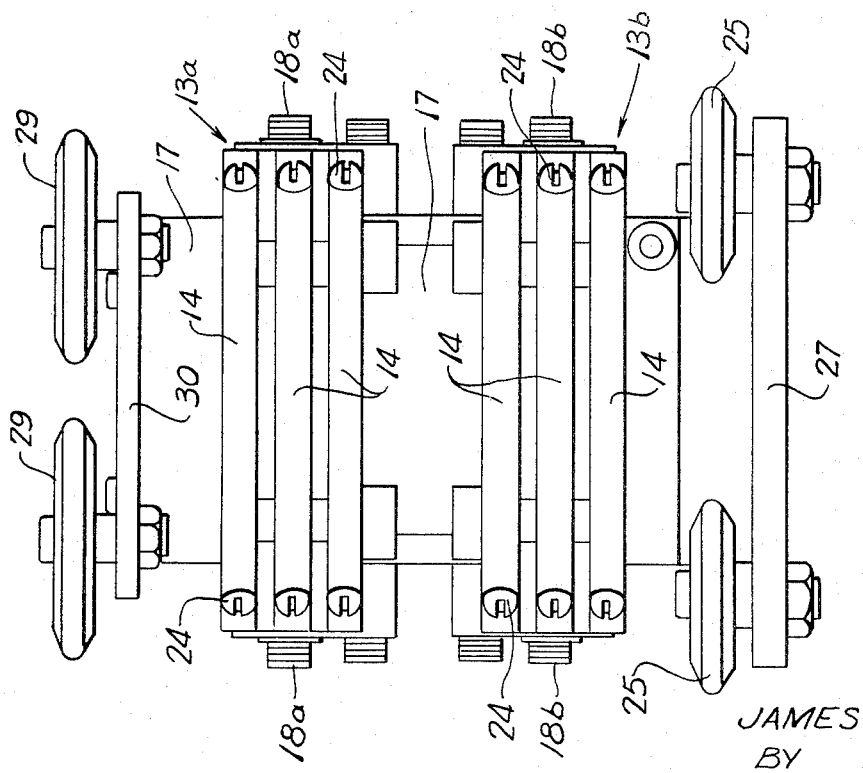
FIG. 3 is an elevational view taken on line 3—3 in FIG. 2.

As shown in FIGS. 1–3, the preferred form of apparatus for inspecting relatively taller containers 10 includes two sensing means 13a, 13b spaced apart along the axis of container 10. Sensing means 13a, 13b are connected by corresponding coaxial cables 40a, 40b to indicating means or circuits 39a, 39b, respectively, each similar to that of FIG. 5. In other words, for the arrangement of apparatus shown in FIGS. 1–3, two circuit units or channels 39a, 39b similar to that shown in FIG. 5 would be provided, each including a solenoid such as 126, operatively connected to a common reject mechanism and sharing a common power supply. The speed at which each container 10 is rotated by wheel 32 is governed by such factors as the desired speed of the inspection operation and the response of the circuit of FIG. 5.

When container 10 is relatively smaller, it may be desirable to modify the apparatus of FIGS. 1–3 to include a single sensing means having five electrodes or bands 14 instead of two sensing means each having three bands. The most sensitive area of each sensing means 13 under the bands 14 is between the band air gaps. If two sensing means each comprising three bands or electrodes were used on a relatively smaller container, two bands 14 connected at ground or reference potential would be adjacent each other. By using a single sensing means including the five bands, the most sensitive areas can be positioned about a quarter of an inch apart and made about a quarter of an inch in size, whereby two areas of the container can be monitored on each channel, thereby giving more symmetrical measurements and tighter coverage of the container 10.

Figure 7:
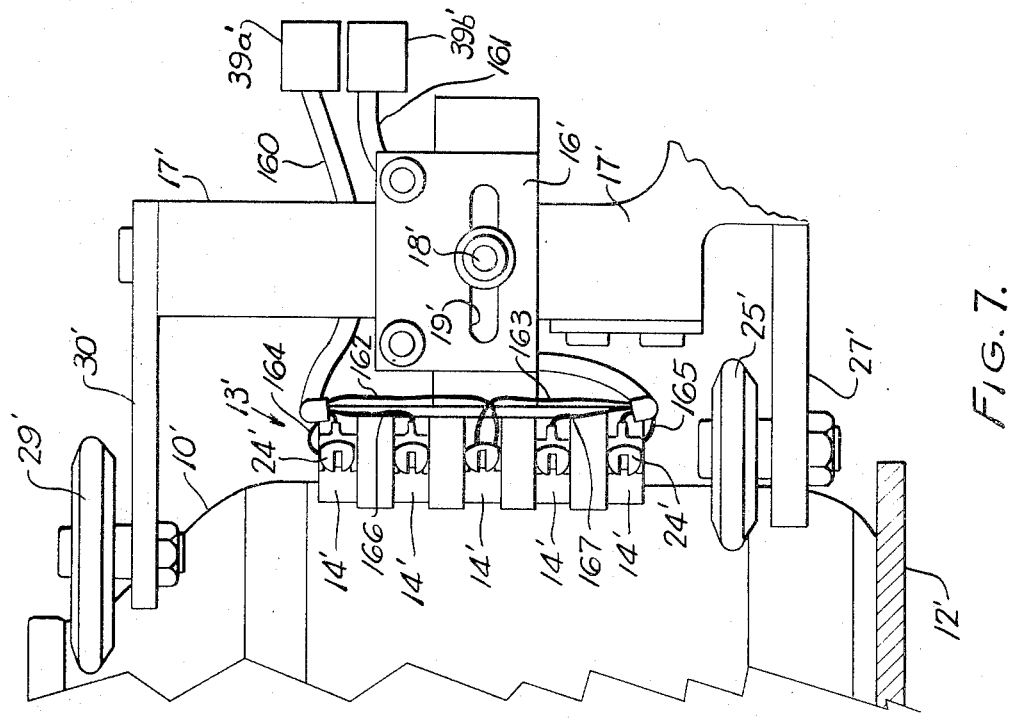
FIG. 7 is a fragmentary elevational view showing an alternative form of the sensing means of the apparatus of the present invention.

Referring now to FIG. 7, there is shown an apparatus wherein the sensing means includes five bands or electrodes and wherein the other components or parts are similar to the apparatus of FIGS. 1–3. The components of the apparatus of FIG. 7 which are identical to those shown in FIGS. 1–3 are given reference numerals with a prime superscript. Thus a container 10' is transported to an inspection station adjacent the apparatus by a conveyor belt 12'. Wheels 25' and 29' contact the base region and neck portions, respectively, of container 10', and a spinner wheel 32' also contacts container 10' for rotating the same. Five electrodes or bands designated 14' are attached to a bracket 16' by means including screws 24'. Bands 14' are preferably of spring metal and are placed during operation in rubbing contact with the outer surface of container 10'. In addition, electrodes 14' are flexed to wrap around a portion of the container surface. A pair of coaxial cables 160 and 161 are provided for connecting various ones of the bands 14' to a pair of circuits or channels each similar to that shown in FIG. 5. The center one as well as the two outer bands 14' are connected through leads 162, 164 to the outer conductor or sheath of the corresponding coaxial cables 160, 161 which outer conductors, in turn, are grounded in a manner similar to outer conductor 42 of cable 40 shown in FIG. 5. The remaining two bands 14' are connected through leads 166, 167 to the inner conductors of cables 160 and 161, respectively.

I claim:

1. Apparatus for detecting variations in the thickness of articles formed of a dielectric material comprising:
   a. sensing means of flexible conducting material in rubbing contact with a surface of an article whereby said sensing means, said article and the surrounding air jointly comprise a capacitance and said sensing means conforms to the surface of said article;
   b. indicating means connected to said sensing means for providing an electrical signal in response to a change in said capacitance; and
   c. means for moving said article in a regular pattern, including movement relative to said sensing means when said article and said sensing means are in rubbing contact;
   d. whereby a variation in the thickness of said article changes said capacitance to cause said indicating means to provide a signal.

2. Apparatus according to claim 1 wherein said sensing means comprises a plurality of electrodes of resilient conducting material adapted to conform to the shape of the surface of said article when said article is placed in rubbing contact with said sensing means.

3. Apparatus according to claim 2 wherein each of said electrodes comprises a strip of spring metal disposed so that the longitudinal axis thereof is generally parallel with respect to the direction of movement of said article relative to said sensing means when said article and said sensing means are in rubbing contact.

4. Apparatus according to claim 1 wherein said indicating means comprises:
   a. a bridge circuit including inductive and capacitive legs;
   b. means for connecting said sensing means to said bridge circuit whereby said capacitance provided by said sensing means and said article comprises one leg of said bridge;
   c. means connected to said bridge for producing an output signal as determined by the capacitance produced in response to the thickness of said article; and
   d. means for connecting a source of electrical energy to said bridge circuit and to said output signal producing means.

5. Apparatus according to claim 4 wherein said output signal producing means includes an oscillator and wherein said bridge circuit includes tuning means, whereby the presence or absence of a signal from said oscillator is determined by the variation of thickness of said article being in excess of a predetermined amount.

6. Apparatus according to claim 1 further including reject means operatively connected to said indicating means for separating those articles having a variation in thickness under control of said indicating means.

7. Apparatus according to claim 1 wherein said article is a container of glass or like dielectric material and wherein said means for moving said article comprises:
   a. means for moving a succession of containers into an inspection station; and
   b. means at said station for placing said articles in rubbing contact with said sensing means and for rotating said containers about their vertical axes.

8. Apparatus for detecting variations in the thickness of containers of glass or like dielectric material comprising:
   a. means for moving a succession of containers into an inspection station;
   b. a plurality of electrodes of flexible conducting material;
   c. means for mounting said electrodes at said inspection station whereby said electrodes are permitted to flex and conform to the shape of the surface of a container when said container is placed in rubbing contact with said electrodes;
   d. means at said inspection station for placing said container in rubbing contact with said electrodes and for rotating said container about its vertical axis;
   e. means for applying an electrical potential to said electrodes; and
   f. means connected to said electrodes for producing an electrical signal in response to a change in capacitance associated with said electrodes caused by a deviation in the thickness of said container from a predetermined standard.

9. Apparatus according to claim 8 wherein each of said electrodes comprises a strip of spring metal disposed so that the longitudinal axis thereof is generally perpendicular with respect to the axis of said container when said electrodes and said container are in rubbing contact.

10. Apparatus according to claim 8 wherein said signal producing means comprises:
   a. a bridge circuit including inductive and capacitive legs;
   b. means for connecting said electrodes to said bridge circuit whereby the capacitance provided by said electrodes, said container in rubbing contact with said electrodes, and the adjacent air comprise one leg of said bridge; and c. means connected to said bridge for producing an output signal as determined by the capacitance produced in response to the thickness of said container.

11. Apparatus according to claim 10 wherein said output signal producing m producing means includes an oscillator and wherein said bridge circuit includes tuning means, whereby the presence or absence of a signal from said oscillator is determined by the variations of thickness of said container in excess of a predetermined amount.

12. Apparatus according to claim 8 further including reject means operatively connected to said signal producing means for rejecting or separating those containers having wall thickness deviations in excess of said standard.

13. A method of inspecting containers of glass or like dielectric material for wall thickness variations comprising the steps of:

a. moving said container so as to place the outer wall surface of said container in rubbing contact with a plurality of flexible electrodes which, together with said container wall and the surrounding air comprises a capacitance;
b. said step of moving being continued until said electrodes flex slightly to conform to a portion of said container outer wall surface;
c. rotating said container about the axis thereof while said outer wall surface is in rubbing contact with said electrodes;
d. producing an electrical signal indicative of changes in said capacitance resulting from changes in the thickness of said container wall which exceed a predetermined amount; and
e. utilizing said signal to reject or separate those containers having said wall thickness variations.

* * * * *